(12) United States Patent
Ishikawa et al.

(10) Patent No.: US 7,347,397 B2
(45) Date of Patent: Mar. 25, 2008

(54) REEL AND RECORDING TAPE CARTRIDGE

(75) Inventors: Ren Ishikawa, Odawara (JP); Teruo Ashikawa, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/751,713

(22) Filed: May 22, 2007

(65) Prior Publication Data

US 2007/0272790 A1    Nov. 29, 2007

(30) Foreign Application Priority Data

May 23, 2006   (JP)   ............................. 2006-142996
Jul. 19, 2006   (JP)   ............................. 2006-196917

(51) Int. Cl.
  *B65H 75/08*   (2006.01)
(52) U.S. Cl. ................ 242/613.4; 242/348; 242/610.5

(58) Field of Classification Search ................ 242/348, 242/348.2, 609, 610, 610.4, 610.5, 610.6, 242/611, 613, 613.4
See application file for complete search history.

(56) References Cited

U.S. PATENT DOCUMENTS

| | | | |
|---|---|---|---|
| 3,485,457 A * | 12/1969 | Hultgren | 242/613.4 |
| 6,913,219 B2 * | 7/2005 | Hiraguchi et al. | 242/348 |
| 7,168,655 B2 * | 1/2007 | Morita | 242/610.4 |
| 7,300,016 B2 * | 11/2007 | Brown et al. | 242/613.4 |
| 2003/0226924 A1 * | 12/2003 | Morita | 242/348 |

* cited by examiner

*Primary Examiner*—William A Rivera
(74) *Attorney, Agent, or Firm*—Sughrue Mion, PLLC

(57) ABSTRACT

A reel includes a hub around which recording tape is wound and flanges that are disposed on both end portions of the hub and hold width direction end portions of the recording tape. The hub includes a cylindrical reinforcement ring, a resin ring integrally molded on the outer peripheral surface of the reinforcement ring, and a consecutive portion made of resin that covers one end portion of the reinforcement ring and is continuous with the resin ring. Exposure portions where the one end portion of the reinforcement ring is exposed are formed in the consecutive portion.

30 Claims, 15 Drawing Sheets

FIG.7
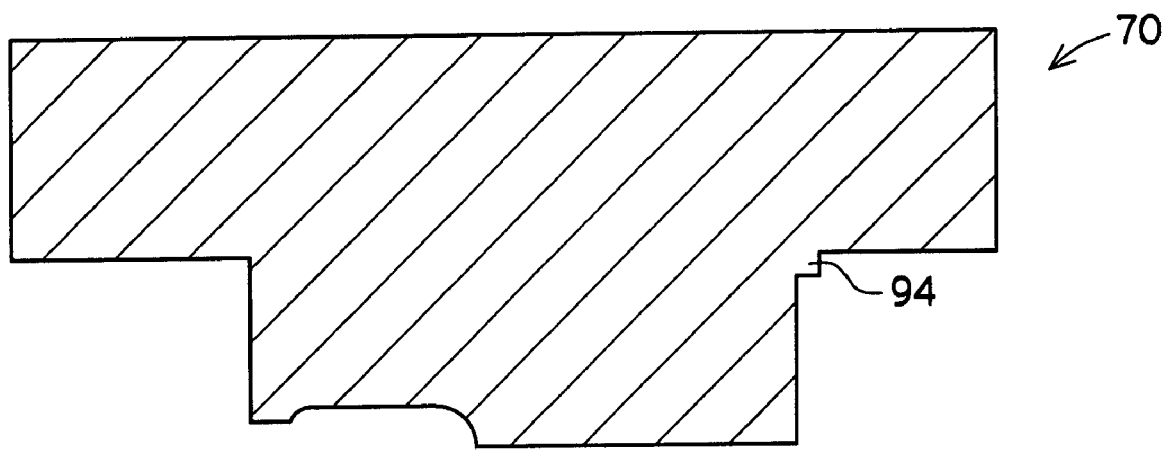
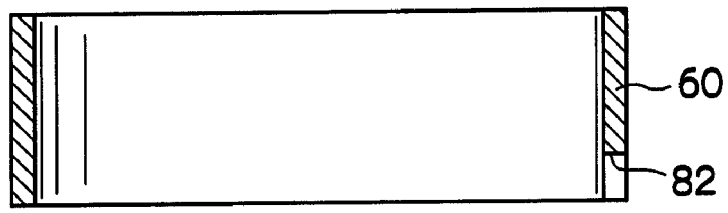
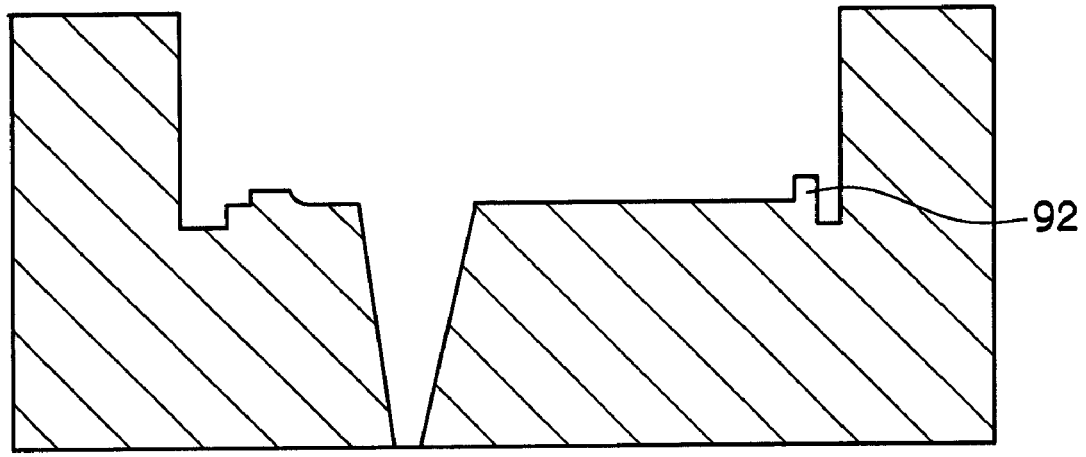

FIG.14
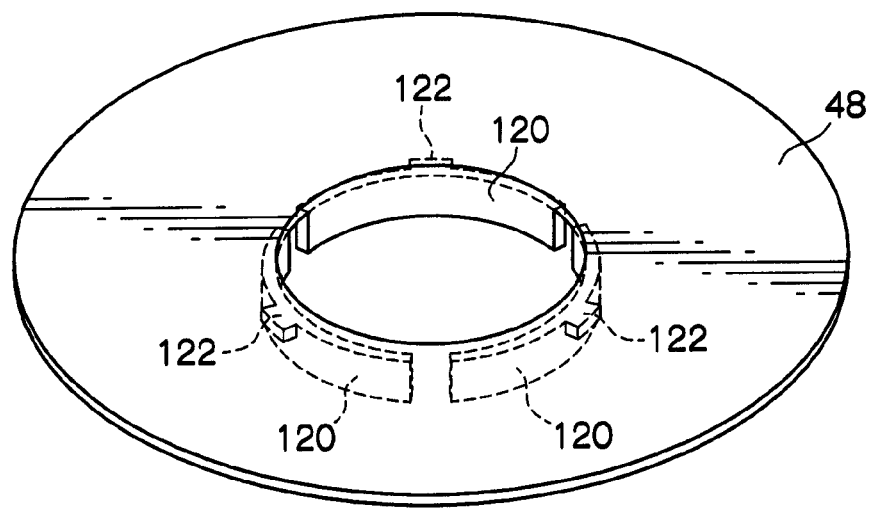
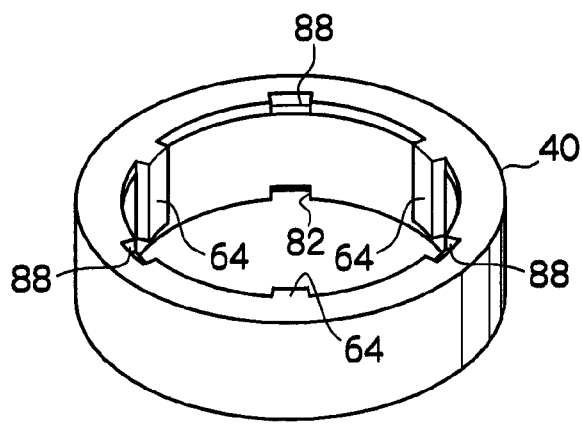
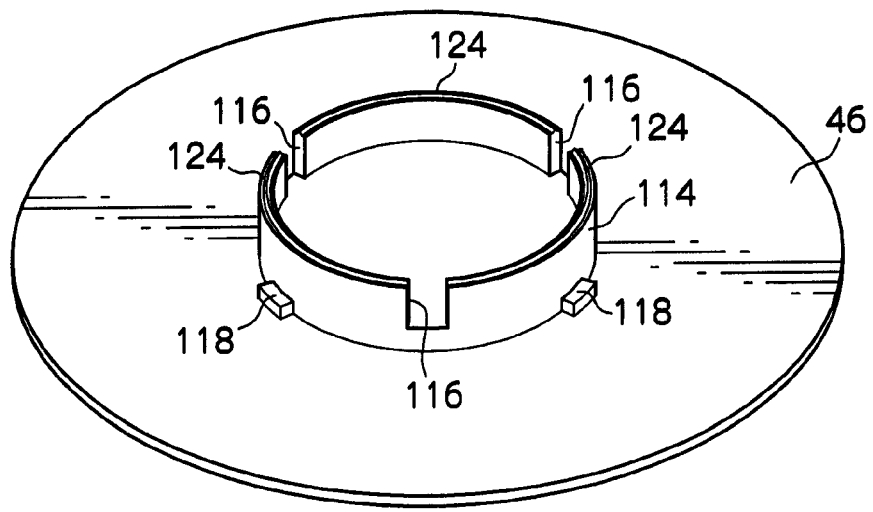

REEL AND RECORDING TAPE CARTRIDGE

CROSS-REFERENCE TO RELATED APPLICATIONS

This application claims priority under 35 USC 119 from Japanese Patent Application Nos. 2006-142996 and 2006-196917, the disclosures of which are incorporated by reference herein.

BACKGROUND OF THE INVENTION

1. Field of the Invention

The present invention relates to a reel on which recording tape such as magnetic tape is wound and to a recording tape cartridge.

2. Description of the Related Art

As external storage media for computers and the like, recording tape cartridges that include a case housing a reel onto which recording tape such as magnetic tape, for example, is wound are known. The reel includes a hub, which configures the axial center portion of the reel and around whose outer periphery the magnetic tape is wound, and an upper flange and a lower flange, which project outward in the radial direction from both axial line direction ends of the hub.

In a recording tape cartridge, the recording tape is wound onto the reel and the reel is rotatably housed inside the case. A leader member, such as a leader pin, leader tape, or a leader block, is disposed on the distal end (free end) of the recording tape.

When the recording tape cartridge is loaded into a drive device and the recording tape is wound out, pullout means disposed in the drive device pulls out the leader member from an opening in the recording tape cartridge. Then, the recording tape fixed to the pullout member is wound onto a take-up reel of the drive device.

In the reel of the recording tape cartridge, the recording tape is ordinarily wound around the outer peripheral surface of the hub. The upper flange and the lower flange are disposed on the top and bottom of the hub, the height position of the recording tape in the vertical direction is limited by the upper and lower flanges, the recording tape is retained such that its wound form is satisfactory, its running stability is improved, and excessive damage is prevented when the recording tape is not in use.

Incidentally, oftentimes the hub is formed in a bottomed circular cylinder shape where one axial line direction side is open and the other side is closed. In the hub formed in such a bottomed circular cylinder shape, the open end side, whose strength is low, is easily deformed by the winding pressure of the magnetic tape. When the hub becomes deformed in this manner, the flange disposed on the open end side of the hub becomes deformed in the direction in which it contacts the width direction end portion (edge) of the magnetic tape.

For this reason, a configuration that reinforces the hub with a metal ring in order to prevent deformation of the hub, such as the configurations described in Japanese Patent Application Publication (JP-A) Nos. 2004-14022 and 2005-116163, is conceivable, but when the outer peripheral surface of the metal ring is covered with resin by insert molding so that the metal ring and the resin are integrated, the position of the metal ring becomes shifted by pressure applied by the resin during injection molding when the metal ring is not properly fixed inside the mold that molds the hub.

SUMMARY OF THE INVENTION

It is an object of the present invention to provide a reel and a recording tape cartridge that address this problem, and a first aspect thereof is a reel comprising: a hub around which recording tape is wound; and flanges that are disposed on both end portions of the hub and hold width direction end portions of the recording tape, wherein the hub includes a cylindrical reinforcement ring, a resin ring integrally molded on the outer peripheral surface of the reinforcement ring, and a consecutive portion made of resin that covers one end portion of the reinforcement ring and is continuous with the resin ring, and exposure portions where the one end portion of the reinforcement ring is exposed are formed in the consecutive portion.

BRIEF DESCRIPTION OF THE DRAWINGS

FIG. 7 is a schematic cross-sectional view showing a state of opening the mold for molding the hub of the reel pertaining to the embodiment of the invention;

FIG. 14 is a schematic exploded perspective view showing a second modification of the reel pertaining to the embodiment of the invention.

DESCRIPTION OF THE PREFERRED EMBODIMENTS

A reel 10 pertaining to an embodiment of the present invention will be described on the basis of FIG. 1 to FIG. 4.

First, the schematic overall configuration of a recording tape cartridge 12 to which the reel 10 is applied will be described, and then the reel 10 will be described in detail. For the convenience of description, arrow A will represent the direction in which the recording tape cartridge 12 is loaded into a drive device and be referred to as a front direction (front side), and arrow B and arrow C, which represent directions orthogonal to the direction represented by arrow A, will respectively represent a right direction and an up direction.

Configuration of the Recording Tape Cartridge

Figure 1:
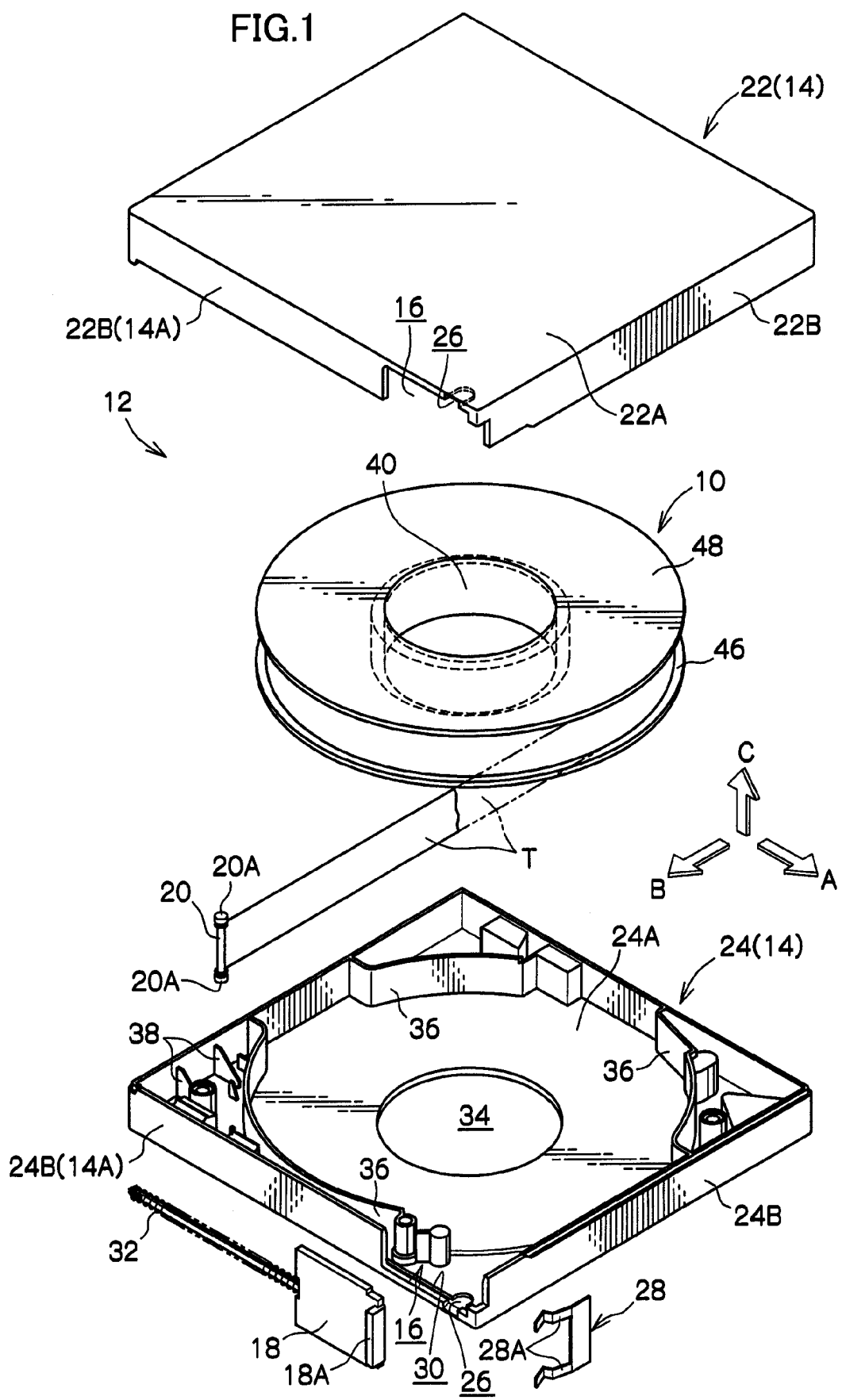
FIG. 1 is an exploded perspective view showing the overall configuration of a recording tape cartridge pertaining to an embodiment of the invention.

As shown in FIG. 1, the recording tape cartridge 12 is configured to include a case 14 and a single reel 10. The case 14 has a substantially rectangular plane shape, and the reel 10 is rotatably housed inside the case 14. Magnetic tape T serving as recording tape that is an information recording and playback medium is wound onto the reel 10.

An opening 16 for allowing the magnetic tape T to be pulled outside the case 14 is disposed in the front end portion of a right side wall of the case 14. The opening 16 is closed by a door 18 when the recording tape cartridge 12 (the magnetic tape T) is not in use, and the opening 16 is opened inside the drive device when the recording tape cartridge 12 is in use.

A leader pin 20 that is a leader member is attached to the distal end of the magnetic tape T. The leader pin 20 is formed in a small circular column shape, and flange portions 20A are disposed on both longitudinal direction ends of the leader pin 20 that project further upward and downward than the width direction end portions of the magnetic tape T. The magnetic tape T is pulled out from the case 14 as a result of the flange portions 20A being caught by a pullout member of the drive device.

The case 14 is disposed with an upper case 22 and a lower case 24. The upper case 22 is configured by a substantially rectangular top plate 22A and a substantially frame-like peripheral wall 22B that is disposed upright along the outer edge of the top plate 22A. The lower case 24 is configured by a bottom plate 24A of a shape substantially corresponding to the top plate 22A and a peripheral wall 24B that is disposed upright along the outer edge of the bottom plate 24A. The case 14 is formed in a substantially box-like shape when the upper case 22 and the lower case 24 are joined together by ultrasonic welding or with screws in a state where the open end of the peripheral wall 22B and the open end of the peripheral wall 24B have been brought into contact with each other.

The opening 16 is formed in a substantially rectangular shape and opens rightward at the front end of a right side wall 14A (the wall of the case 14 that faces right and is configured by the peripheral wall 22B and the peripheral wall 24B) of the case 14 along the direction of arrow A. Pin holding recesses 26 that house the flange portions 20A of the upright leader pin 20 are disposed in the top plate 22A and the bottom plate 24A. Each of the pin holding recesses 26 opens rightward in the vicinity of the front end of the opening 16 and enables the leader pin 20 to enter and exit the case 14 via the opening 16.

A plate spring 28 is attached in the vicinity of the front end of the case 14, and an upper and lower pair of arms 28A is disposed on the plate spring 28. The plate spring 28 is formed such that distal ends of the arms 28A are caused to engage with the flange portions 20A of the leader pin 20 and hold the leader pin 20 with respect to the case 14. This held state is released by pulling the leader pin 20 to the right with a force equal to or greater than a predetermined value.

The door 18 that opens and closes the opening 16 is formed in a substantially rectangular flat plate shape capable of closing the opening 16 on its own. The end portions on the top and bottom of the door 18 fit into guide grooves 30 disposed in the top plate 22A and the bottom plate 24A such that the door 18 is slidable along the open surface of the opening 16 and the right side wall 14A.

Thus, the door 18 is configured to slide frontward and rearward while being guided in the guide grooves 30 such that the door 18 can selectively assume a closed position where it closes the opening 16 and an open position where it opens the opening 16. The door 18 is also urged frontward by a coil spring 32 that is a urging member disposed between the door 18 and the case 14, so the door 18 is ordinarily positioned in the closed position by this urging force. An operation portion 18A is disposed on the front end of the door 18 so as to project rightward. The door 18 can be moved to the open position counter to the urging force of the coil spring 32 by pressing the operation portion 18A rearward.

A gear opening 34 for exposing a later-described reel gear 50 (see FIG. 2) of the reel 10 is disposed in the center portion of the bottom plate 24A of the case 14. The reel 10 is driven to rotate, without contact, inside the case 14 when a drive gear of the drive device meshes with the reel gear 50 and rotates.

The case 14 is also disposed with a guide regulation wall 36. The guide regulation wall 36 is upright disposed on the top plate 22A and the bottom plate 24A in a partial circular shape concentric with the gear opening 34, and its upper and lower ends are brought into contact with each other. The guide regulation wall 36 is configured to control rattling of the reel 10 and, at the same time, its end portions are formed continuously with the peripheral walls 22B and 24B to prevent the ingress of dust and the like into the area where the reel 10 is disposed.

Configuration of the Reel

Figure 2:
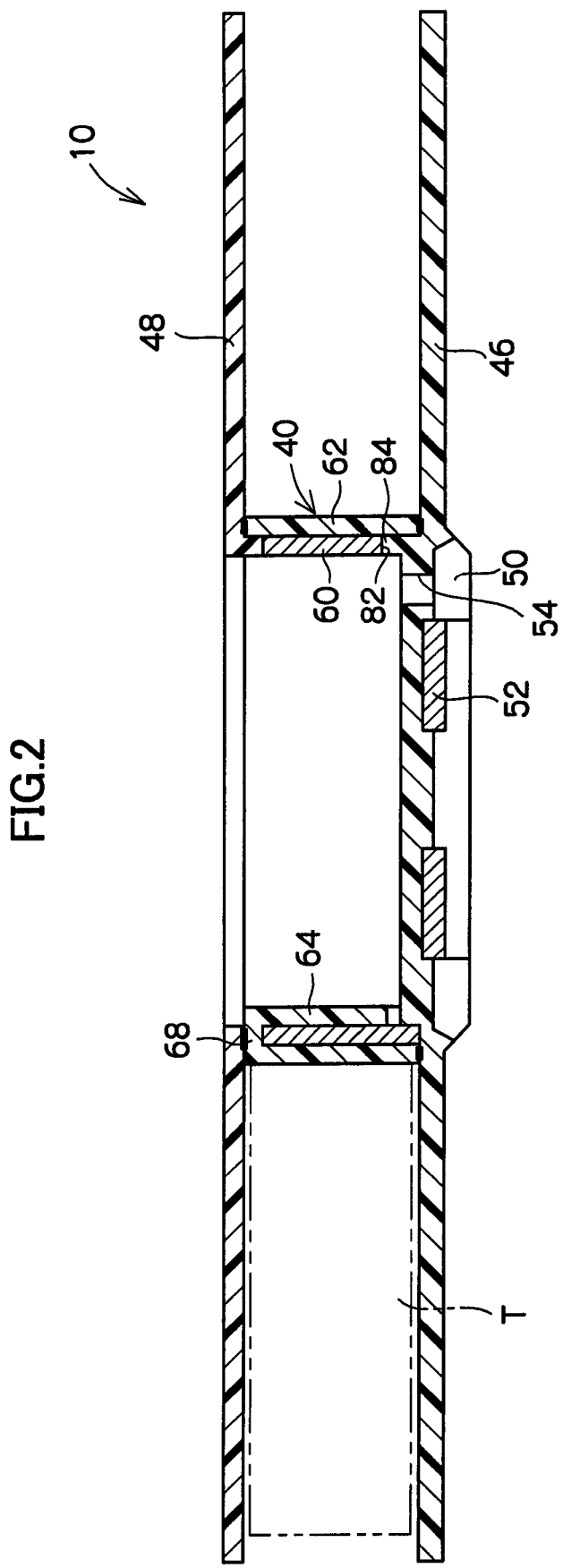
FIG. 2 is a schematic cross-sectional view showing a reel pertaining to the embodiment of the invention.
Figure 3:
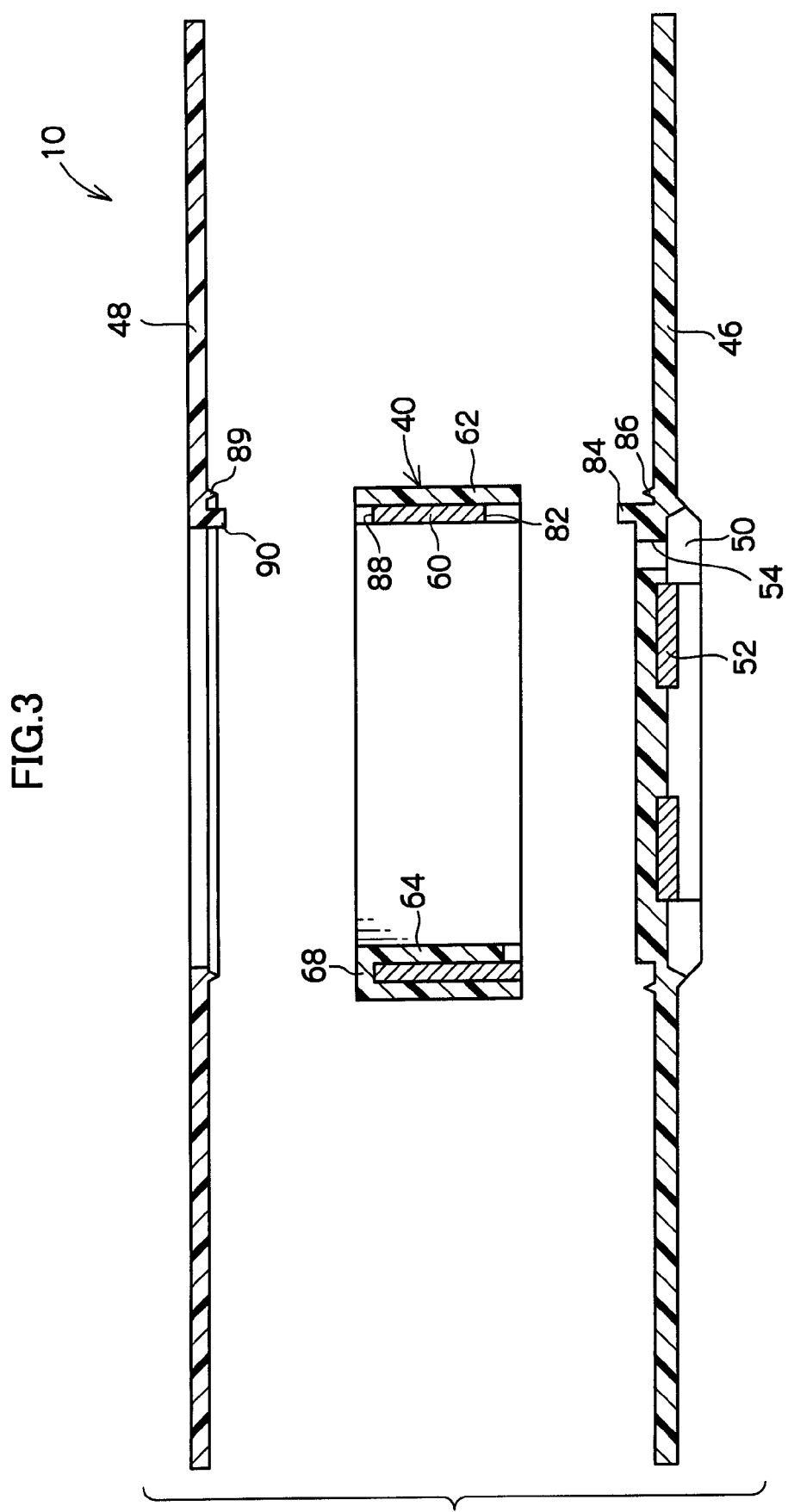
FIG. 3 is a schematic exploded cross-sectional view of the reel pertaining to the embodiment of the invention.

As shown in FIG. 2 and FIG. 3, the reel 10 is broadly divided into an annular upper flange 48, a substantially circular cylinder-shaped hub 40, and a substantially discoid lower flange 46. Each is formed by a resin (e.g., a polycarbonate including 10% glass fiber), but a metal ring 60 (reinforcement ring) made of aluminium is integrally formed with the hub 40.

Figure 4:
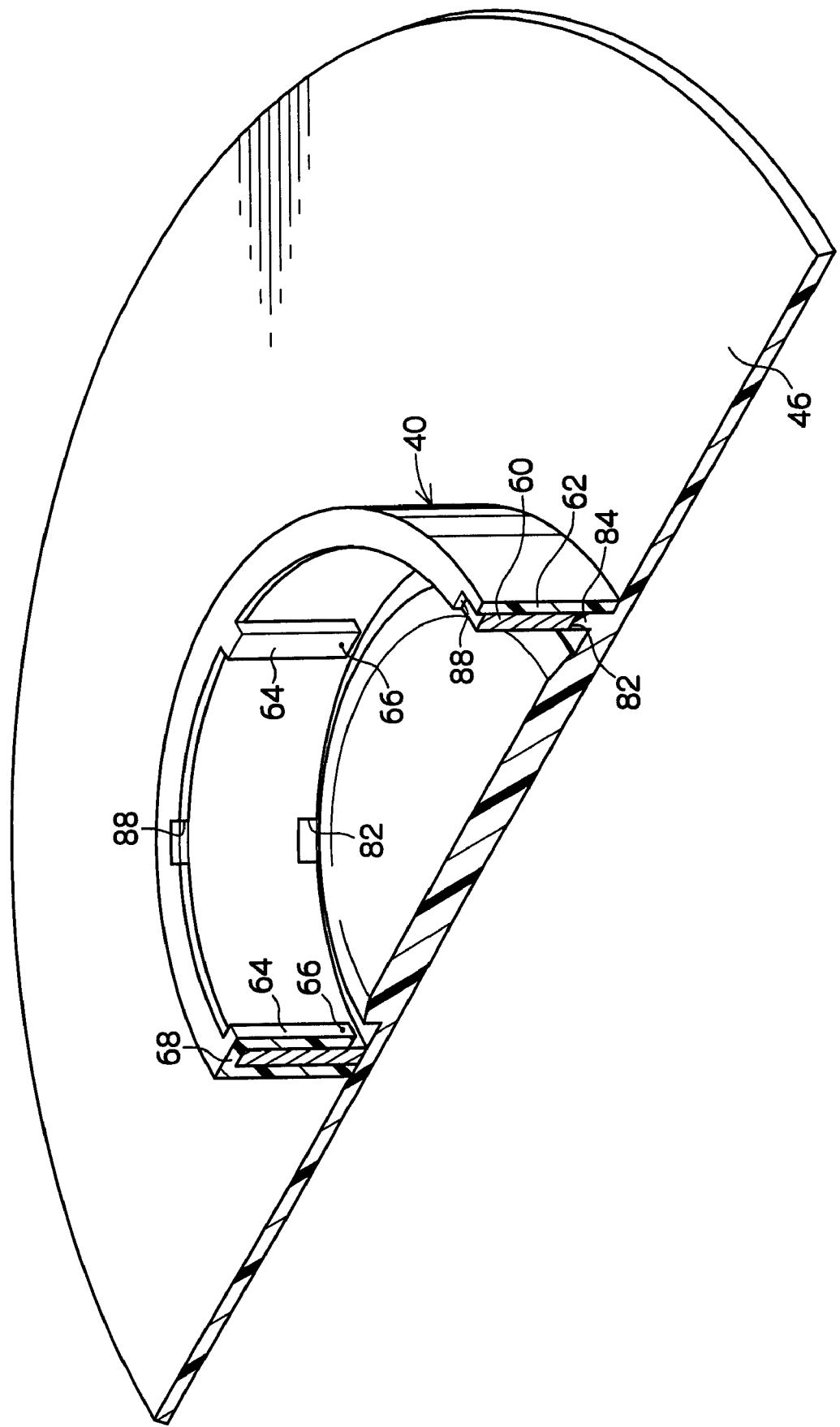
FIG. 4 is a schematic perspective view showing a lower flange and a hub of the reel pertaining to the embodiment of the invention.
Figure 5:
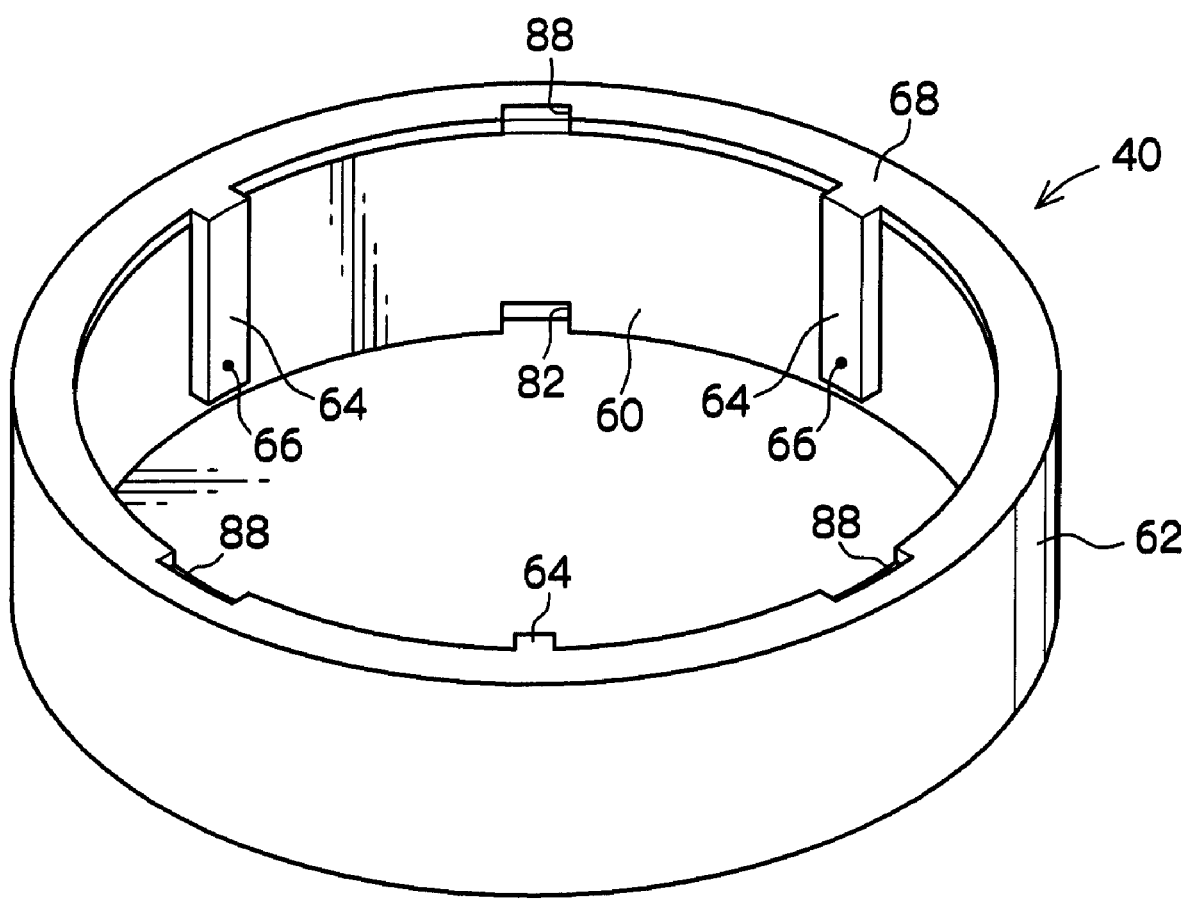
FIG. 5 is a perspective view of the hub of the reel pertaining to the embodiment of the invention.

As shown in FIG. 4 and FIG. 5, the metal ring 60, whose thickness is about 1.25 mm, is disposed on the inner side of the hub 40, and a resin portion (resin ring) 62 whose thickness is about 1.0 mm is disposed on the outer side of the hub 40. Gate ribs 64 (first ribs) having a substantially rectangular parallelepiped shape whose width dimension is about 2 mm are formed on the inner side of the metal ring 60 along the axial direction of the hub 40. The gate ribs 64 are disposed in three locations at equidistant intervals along the circumferential direction of the hub 40.

Gates 66 that are injection openings for injecting resin to mold the hub 40 are disposed in the gate ribs 64. A resin portion 68 (consecutive portion) whose thickness is about 0.8 to 1.0 mm is disposed on the upper end surface (other end surface) of the hub 40 across the entire circumference of the hub 40 and is connected to the gate ribs 64.

Figure 8:
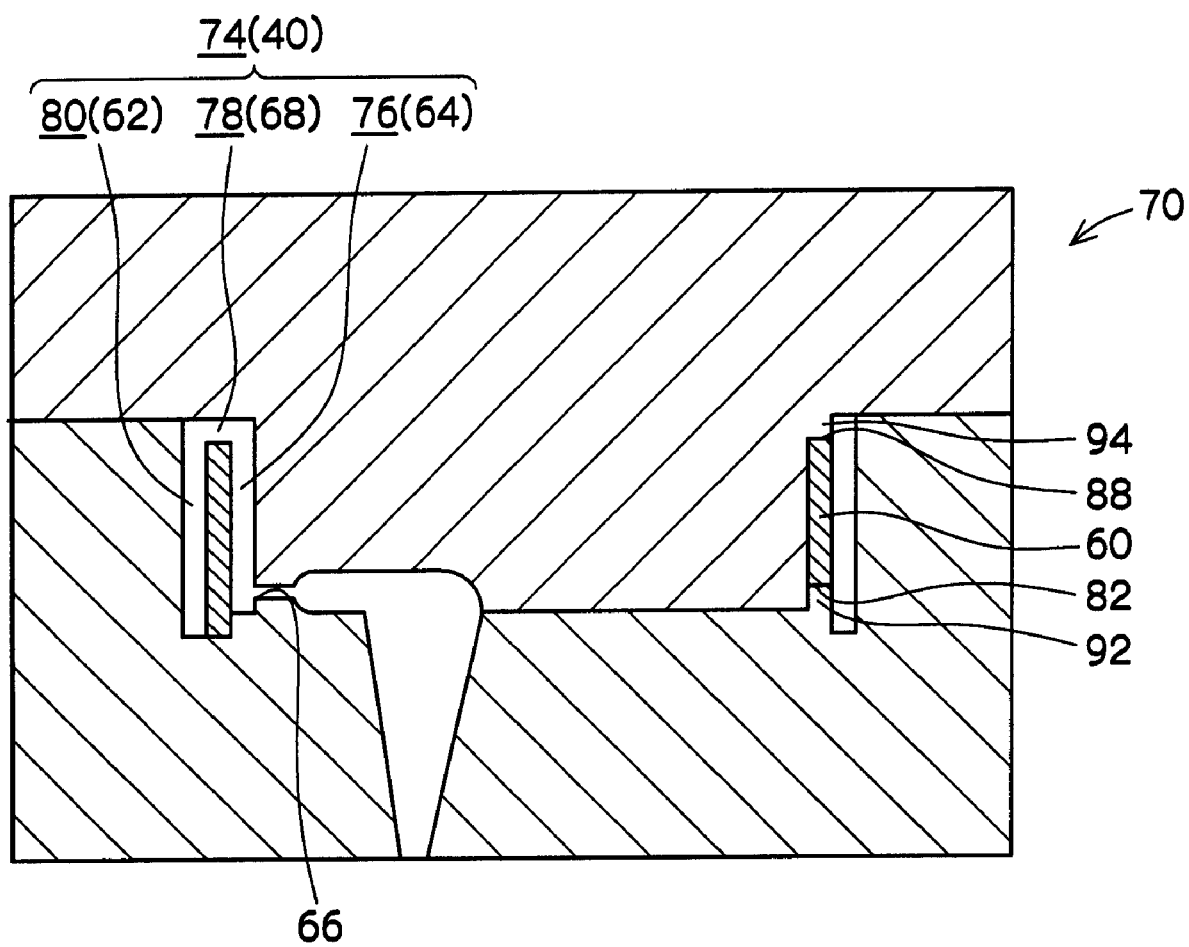
FIG. 8 is a schematic cross-sectional view showing a state of closing the mold for molding the hub of the reel pertaining to the embodiment of the invention.

Thus, as shown in FIG. 8, after the metal ring 60 has been inserted inside a mold 70 that molds the hub 40, the inside of a space 74 formed by the mold 70 is filled with the resin via the gates 66. That is, in the present embodiment, the resin flows from spaces 76 for forming the gate ribs 64, through a space 78 for forming the resin portion 68, and then into a space 80 for forming the resin portion 62, so that the metal ring 60 and the resin portions 62 and 68 are integrally molded.

Further, as shown in FIG. 3 to FIG. 5, substantially rectangular anti-rotation grooves 82 are disposed directly in the middle of each two adjacent gate ribs 64 in the lower end surface (one end surface) of the metal ring 60.

Further, cutout portions (exposure portions) 88 (width dimension: about 4 mm) are formed in the upper end portion of the hub 40 such that their positions along the circumferential direction are the same as those of the anti-rotation grooves 82 parallel to the axial line direction and such that the upper end edge of the metal ring 60 is exposed from the cutout portions 88.

As shown in FIG. 3 and FIG. 4, positioning ribs 84 that have substantially the same shape as the anti-rotation grooves 82 and which engage with the anti-rotation grooves 82 are disposed on, so as to project from, the center side of the lower flange 46 on the same circumference as the lower flange 46. A welding rib 86 whose cross section has a triangular shape is disposed on, so as to project from, the lower flange 46 across the entire circumference of the lower flange 46 on the outer side, and in the vicinity, of the positioning ribs 84.

The lower flange 46 is positioned with respect to the hub 40 by engaging the anti-rotation grooves 82 in the hub with the positioning ribs 84 of the lower flange 46. When the welding rib 86 is melted by ultrasonic welding or the like in a state where the lower flange 46 has been positioned with respect to the hub 40 in this manner and the resin portion 62 of the hub 40 has been brought into contact with the welding rib 86 of the lower flange 46, the hub 40 is welded to the lower flange 46.

As shown in FIG. 3, positioning ribs 90 that have substantially the same shape as the cutout portions 88 and which engage with the cutout portions 88 are disposed on, so as to project from, the center portion of the upper flange 48 on the same circumference as the hub 40. Further, an annular welding rib 89 is disposed on, so as to project from, the upper flange 48 adjacent to the outer side of the positioning ribs 90.

The upper flange 48 is positioned with respect to the hub 40 by engaging the positioning ribs 90 with the cutout portions 88 in the hub 40. When the welding rib 89 is brought into contact with the upper end surface of the hub 40 and melted by ultrasonic welding or the like in a state where the upper flange 48 has been positioned with respect to the hub 40, the upper flange 48 is welded to the hub 40.

As described above, the upper flange 48, the lower flange 46, and the hub 40 are integrated in a state where the upper flange 48, the lower flange 46, and the hub 40 have been coaxially disposed. Additionally, the magnetic tape T is wound around the outer peripheral surface of the hub 40, and the lower flange 46 and the upper flange 48 regulate positional shifting in the width direction (axial line direction of the hub 40) of the magnetic tape T wound around the hub 40.

As shown in FIG. 2 and FIG. 3, an annularly formed reel gear 50 is disposed on the outer surface (undersurface) of the center portion of the lower flange 46. The reel gear 50 is exposed from the gear opening 34 in the case 14 (see FIG. 1) and moves along the axial line direction with respect to a rotating shaft of the drive device, so that the reel gear 50 is capable of meshing with, and disengaging from, a drive gear disposed on the distal end of the rotating shaft.

Further, a reel plate 52 comprising a magnetic material is integrally disposed, by insert molding, on the radial direction inner side of the reel gear 50. The reel plate 52 is attracted to and retained by, without contacting, a magnet disposed on the distal end of the rotating shaft.

Moreover, an unillustrated lock mechanism for deterring rotation of the reel 10 when the magnetic tape T is not in use is disposed on the inner side of the inner surface (upper surface) of the lower flange 46. The lock mechanism includes a lock member that is detented with respect to the case 14 and supported such that the lock member can move into contact with and away from the reel 10. By moving into contact with and by moving away from the reel 10, the lock member can assume a rotation lock position where it engages with an engagement portion (not shown) of the lower flange 46 to deter rotation of the reel 10 with respect to the case 14 and a release position where it disengages from the engagement portion to allow rotation of the reel 10, respectively.

The engagement portion with which the lock member engages is disposed in the lower flange 46, and an operation hole 54 for allowing a lock release member of the drive device to operate the lock member is formed in the lower flange 46. In this embodiment, a configuration is exemplified where the operation hole 54 is disposed in the site where the reel gear 50 is formed, but the operation hole 54 may also be disposed in the axial center portion of the center portion of the lower flange 46, for example.

As described above, the lower flange 46 fulfills the function of being the site where the reel gear 50 is formed so that rotational force is transmitted from the drive device, the function of closing the gear opening 34 in the case 14 when the magnetic tape T is not in use, and the function of making the lock member to engage therewith to deter rotation of the reel 10 with respect to the case 14.

Next, the function of the embodiment of the present invention will be described.

When the recording tape cartridge 12 is loaded into the drive device to record information to the magnetic tape T or play back information recorded on the magnetic tape T, then in the reel 10 shown in FIG. 1 and FIG. 2, the rotational lock deterring the reel 10 from rotating with respect to the case 14 is released and, at the same time, the drive gear of the drive device meshes with the reel gear 50 that the reel 10 includes. Then, when the rotating shaft of the drive gear rotates, the reel 10 rotates inside the case 14 via the drive gear and the reel gear 50.

At this time, the leader pin 20 that has already been removed from the opening 16 is retained in the take-up reel of the drive device, and the take-up reel rotates synchronously with the reel 10, whereby the magnetic tape T is successively pulled out from the case 14. Then, a recording and playback head disposed along a predetermined tape path writes information to the magnetic tape T or reads information recorded on the magnetic tape T. After the magnetic tape T is used, the reel 10 takes up the magnetic tape T and returns to its initial state.

Below, the process of molding the reel 10 will be described.

As previously mentioned, in the reel 10, the resin portion 62 is integrally molded on the outer peripheral surface of the metal ring 60 to form the hub 40, but the upper end portion of the metal ring 60 is covered by the resin portion 68 that is continuous with the resin portion 62, and the gate ribs 64 that are continuous with the resin portion 68 are formed on the inner peripheral surface side of the metal ring 60. Additionally, the gates 66 that become injection openings for injecting the resin during molding are disposed in the gate ribs 64.

As shown in FIG. 8, after the metal ring 60 has been inserted inside the mold 70 that molds the hub 40, the inside of the space 74 formed by the mold 70 is filled with the resin via the gates 66. That is, in the present embodiment, the resin flows from the spaces 76 for forming the gate ribs 64, through the space 78 for forming the resin portion 68, and then into the space 80 for forming the resin portion 62.

By disposing the gate ribs 64 at equidistant intervals along the circumferential direction of the metal ring 60, the resin injected from the gates 66 flows evenly inside the space 74 in the mold 70, so that the hub precision (roundness) can be improved.

As shown in FIG. 5, the anti-rotation grooves 82 that regulate movement of the metal ring 60 in the circumferential direction with respect to the lower flange 46 are disposed in the substantially center portions of adjacent gate ribs 64 and in the lower end portion of the metal ring 60. Further, the cutout portions 88, where the upper end portion of the metal ring 60 is exposed, are formed in the upper end portion of the hub 40 on the same axial line as the anti-rotation grooves 82 parallel to the axial line of the hub 40.

Figure 6:
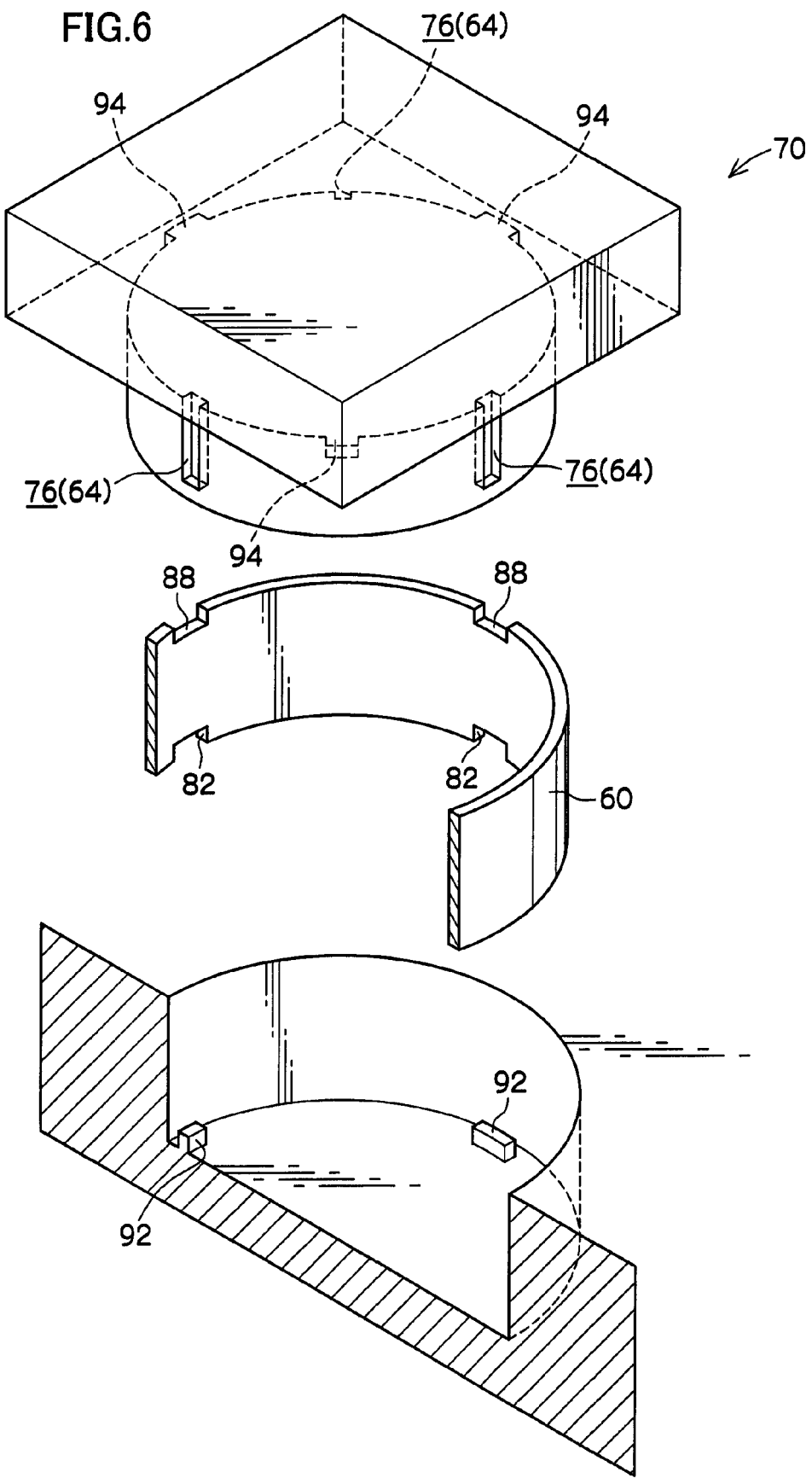
FIG. 6 is a schematic exploded perspective view of a mold for molding the hub of the reel pertaining to the embodiment of the invention.

Here, first, in order to dispose the anti-rotation grooves 82, as shown in FIG. 6 to FIG. 8, projecting portions (anti-rotation projecting portions) 92 of substantially the same shape as the anti-rotation grooves 82 are formed in locations corresponding to the anti-rotation grooves 82 in the mold 70 for forming the hub 40. For this reason, as shown in FIG. 8, when the mold 70 is clamped, the projecting portions 92 come into contact with locations on the metal ring 60 corresponding to the anti-rotation grooves 82. Consequently, during insert molding, rotation of the metal ring 60 is prevented by the projecting portions 92.

Further, as shown in FIG. 6 to FIG. 8, projecting portions (exposure portion-forming projecting portions) 94 of substantially the same shape as the cutout portions 88 are formed in the mold 70 at locations corresponding to the cutout portions 88. When the mold 70 is clamped, the projecting portions 84 come into contact with the upper end portion of the metal ring 60.

Consequently, even if the metal ring 60 receives pressure applied by the resin during injection molding, movement of the metal ring 60 is limited because the projecting portions 94 of the mold 70 come into contact with the upper end portion of the metal ring 60 and the projecting portions 92 of the mold 70 come into contact with the lower end portion of the metal ring 60. For this reason, positional shifting of the metal ring 60 can be prevented, and deformation of the metal ring 60 can also be prevented.

Further, by disposing the projecting portions 92 and the projecting portions 94 in the same positions along the circumferential direction, movement of the metal ring 60 can be limited above and below on the same axial line of the metal ring 60, so that movement of the metal ring 60 can be limited more effectively.

Here, because the resins flowing in from adjacent gates 66 meet each other in the substantially center portions of adjacent gate ribs 64, welds (formed by melted resin joining together) occur. For this reason, the cutout portions 88 are disposed in locations where welds occur in the end surface of the hub 40, so that variations in the dimension of the hub 40 in its height direction can be reduced.

Further, because the gate ribs 64 are disposed in the inner peripheral surface of the metal ring 60, the projecting portions 92 are disposed on the inner peripheral surface side—that is, the gates 66 side—of the metal ring 60. Positional shifting of the metal ring 60 is prevented by disposing the projecting portions 92 on the gates 66 side because pressure from the resin during injection molding is highest in the vicinity of the gates 66.

Figure 9:
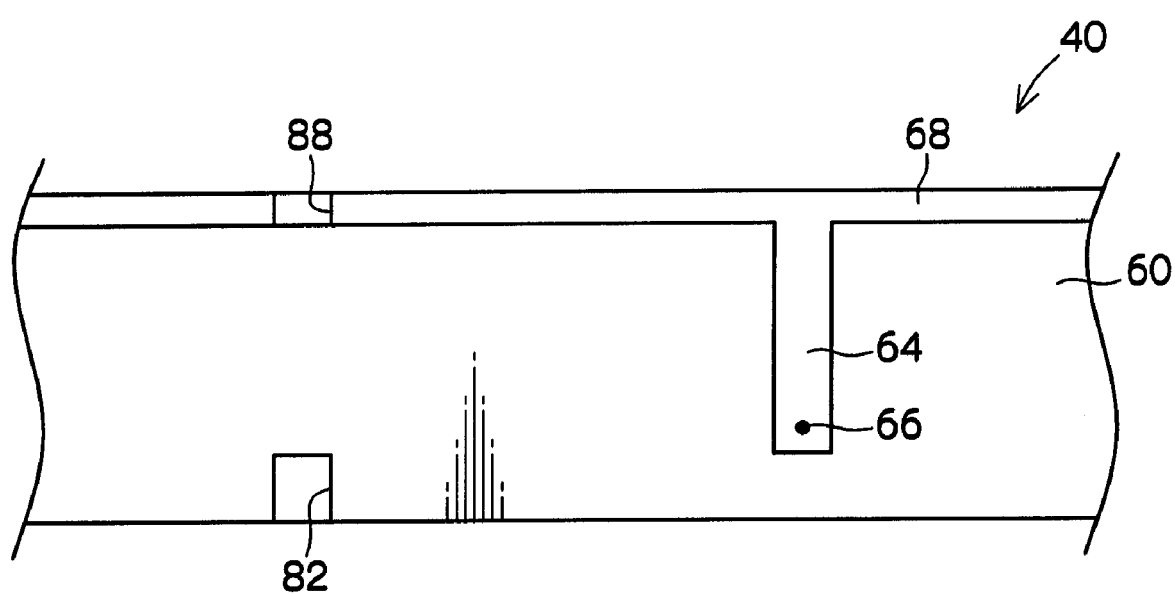
FIG. 9 is a schematic developed view of the hub of the reel pertaining to the embodiment of the invention.

Incidentally, in the present embodiment, as shown in FIG. 9, the gate ribs 64 having a substantially rectangular parallelepiped shape whose width dimension is about 2 mm are disposed on the inner side of the metal ring 60 along the axial direction of the hub 40. Although it is not shown, when gate ribs, at which gates used for molding are formed, are too narrow, the fluidity of the resin worsens, which causes misshaping such as warpage and shrinkage. Further, at the gates 66, the resin pressure becomes a maximum but the resin is injected in one direction from the inside of the hub 40 to the outside thereof.

Figure 10:
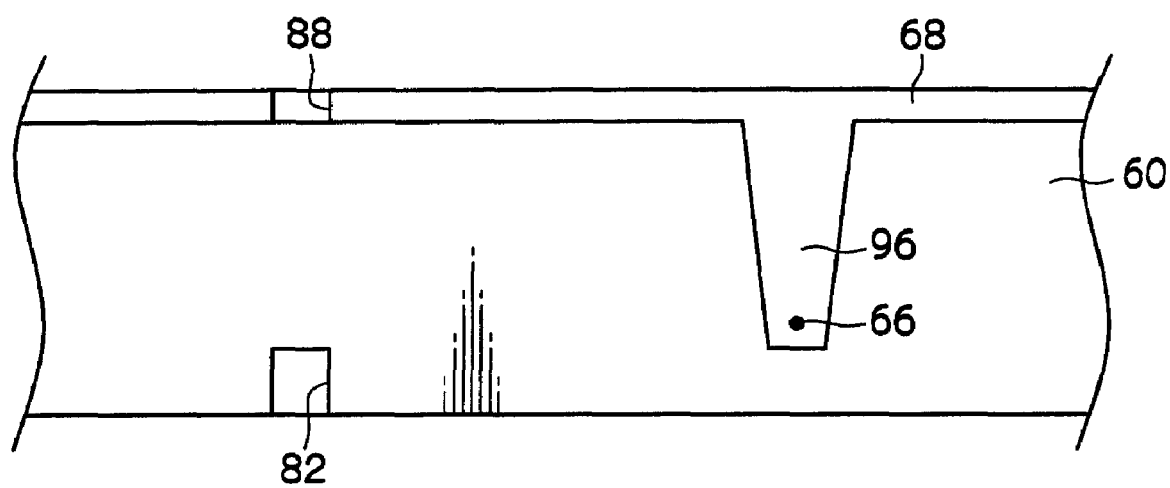
FIG. 10 is a schematic developed view showing a modification of the hub of the reel pertaining to the embodiment of the invention.

For this reason, as shown in FIG. 10, gate ribs 96 (second ribs) can be shaped so that the gate ribs 96 have a width gradually widening from the gates 66 side toward the resin portion 68 side (with the rib width at the gate portion being about 2 mm and the rib width at the resin portion 68 being about 4 mm).

That is, the rib width of the gate ribs 96 at the gates 66 is made the smallest so as to lower the resin pressure beforehand. Additionally, by increasing the rib width away from the gates 66, the flow velocity is lowered so as to raise the pressure.

Thus, it becomes possible to prevent worsening of the resin fluidity. The resin fluidity can also be further improved by gradually increasing the width of the gate ribs 96 from the gates 66 side toward the resin portion 68.

In the present embodiment, the metal ring 60 that is made of aluminium and has a thickness of about 1.25 mm is used as the reinforcement ring, but the thickness of the reinforcement ring is not limited to this because it suffices as long as the reinforcement ring can raise the rigidity of the hub 40. The material of the reinforcement ring is also not limited to metal, and a nonmetal material may also be used. However, when a material that easily corrodes such as aluminium is used for the reinforcement ring, it is preferable to use a reinforcement ring to whose surface an anticorrosion treatment such as plating has been administered. Further, the material of the resin portions 62 and 68 is also not limited to a polycarbonate rein, and other resin materials capable of being injection-molded can be used.

Further, in regard to the structure of the mold 70 for molding the reel 40, the mold is not limited to one having the aforementioned structure because it suffices as long as the projecting portions 92 and 94 that limit the movement of the metal ring 60 are disposed, and the gate format is also not limited to the aforementioned format. Moreover, although the gates 66 were disposed in the gate ribs 64 serving as first ribs and the gate ribs 96 serving as second ribs, it is not invariably necessary for the gates to be disposed in the first ribs and the second ribs, and the gates may also be disposed in ribs for reinforcement.

Further, in the present embodiment, an example was described where the reel 10 was applied to the recording tape cartridge 12 configured to house a single reel inside the case 14, but the present invention is not limited to this. For example, the reel 10 may also be applied to a 2-reel type recording tape cartridge that houses two reels inside a case.

Moreover, in the present embodiment, the reel was configured by three parts—the upper flange, the hub, and the lower flange—but the reel may also be configured by two parts where the hub is integrally molded with the upper flange or the lower flange.

Figure 11:
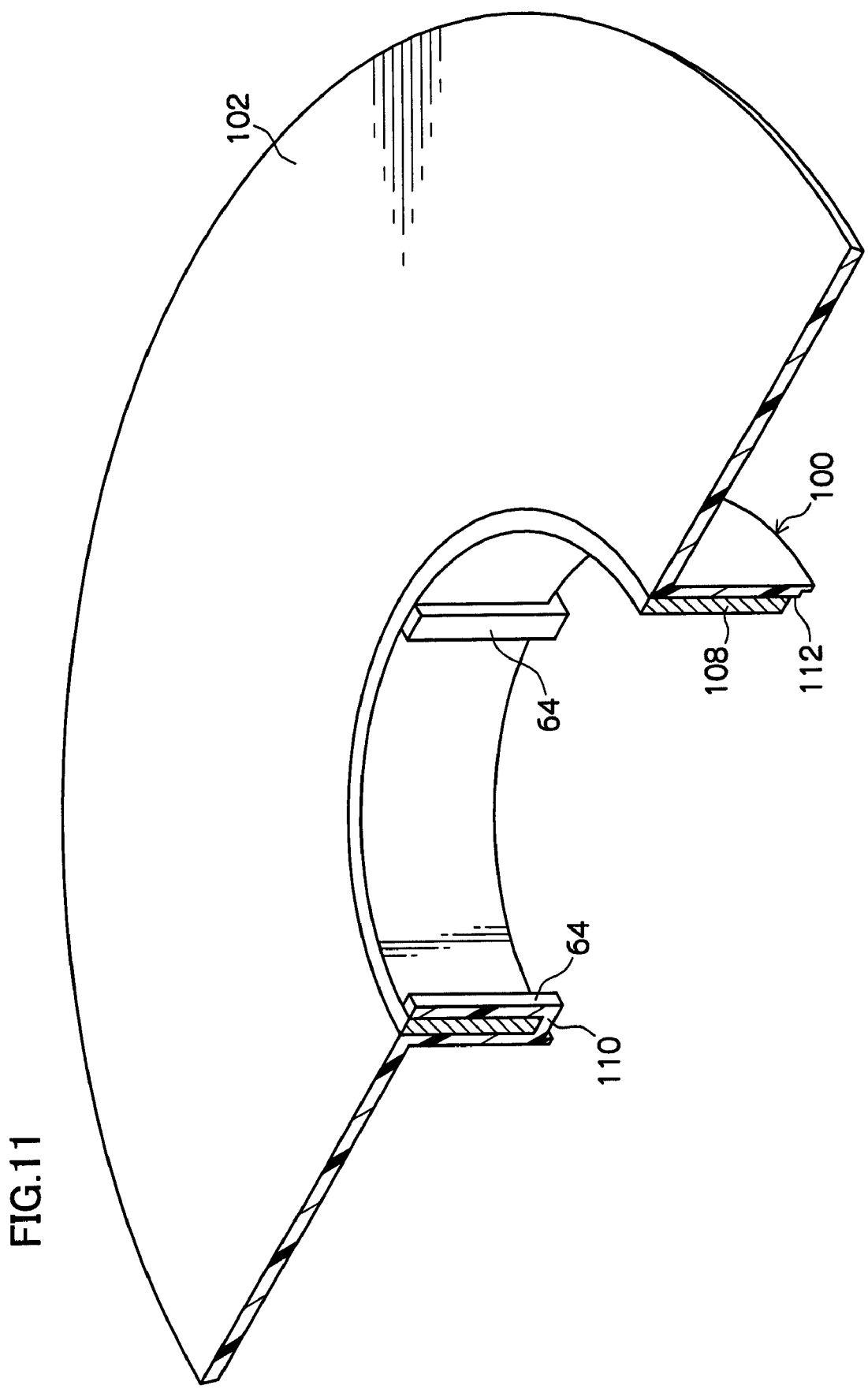
FIG. 11 is a schematic perspective view showing an upper flange and a hub with which a first modification of the reel pertaining to the embodiment of the invention is disposed.
Figure 13:
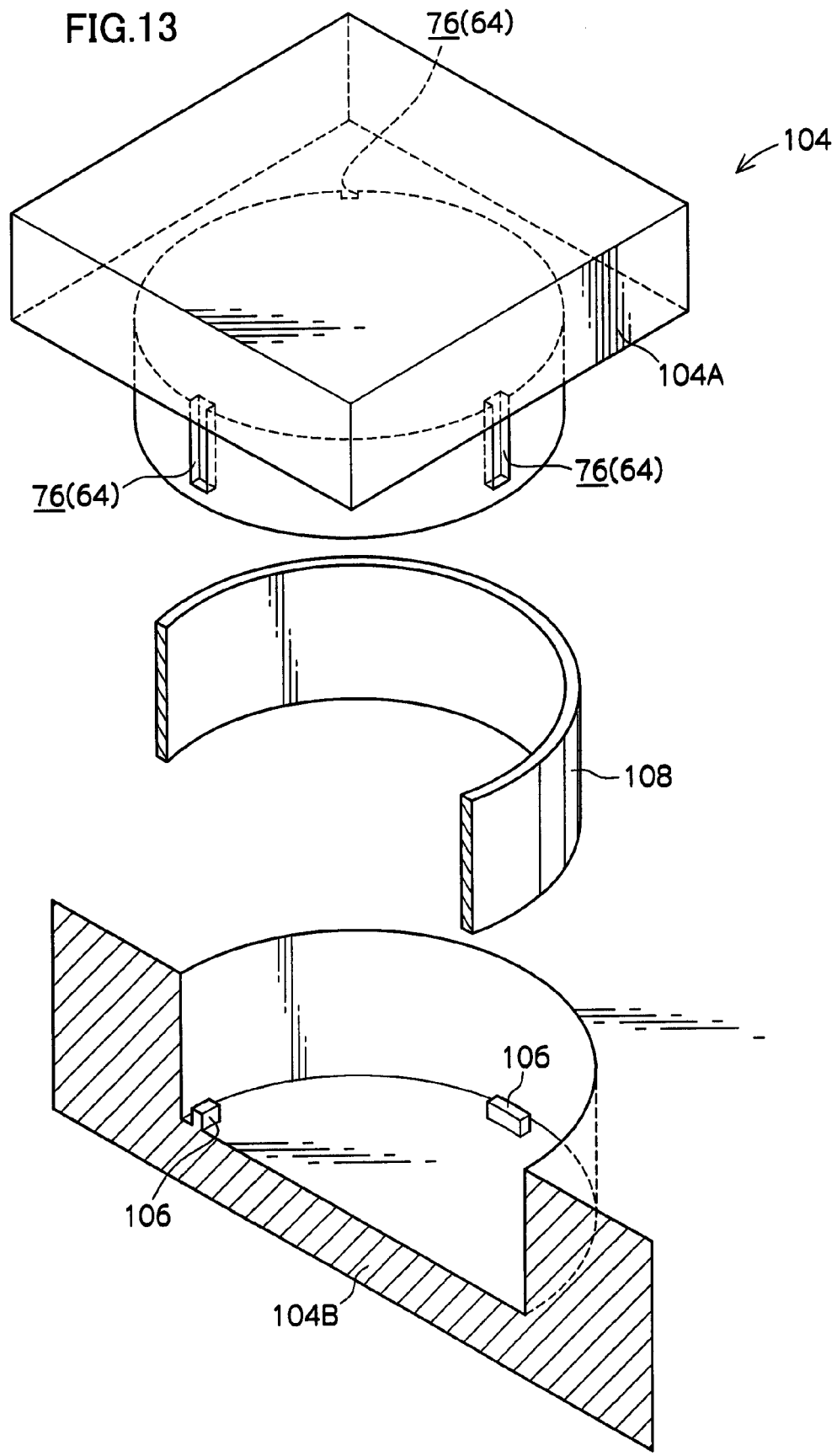
FIG. 13 is a schematic exploded perspective view of a mold for molding the upper flange and the hub with which the first modification of the reel pertaining to the embodiment of the invention is disposed.

For example, as shown in FIG. 11, a part comprising a hub 100 and an upper flange 102 that have been integrally molded together may be welded to a lower flange (not shown). In this embodiment, as shown in FIG. 13, contact projecting portions 106 are formed in a mold 104 for molding the hub 100, and the contact projecting portions 106 come into contact with the lower end surface of a metal ring 108 when the mold 104 is clamped. Thus, during molding of the hub 100 and the upper flange 102, movement of the metal ring 108 is limited by the contact projecting portions 106 and a movable retainer plate 104A of the mold 104.

Figure 12:
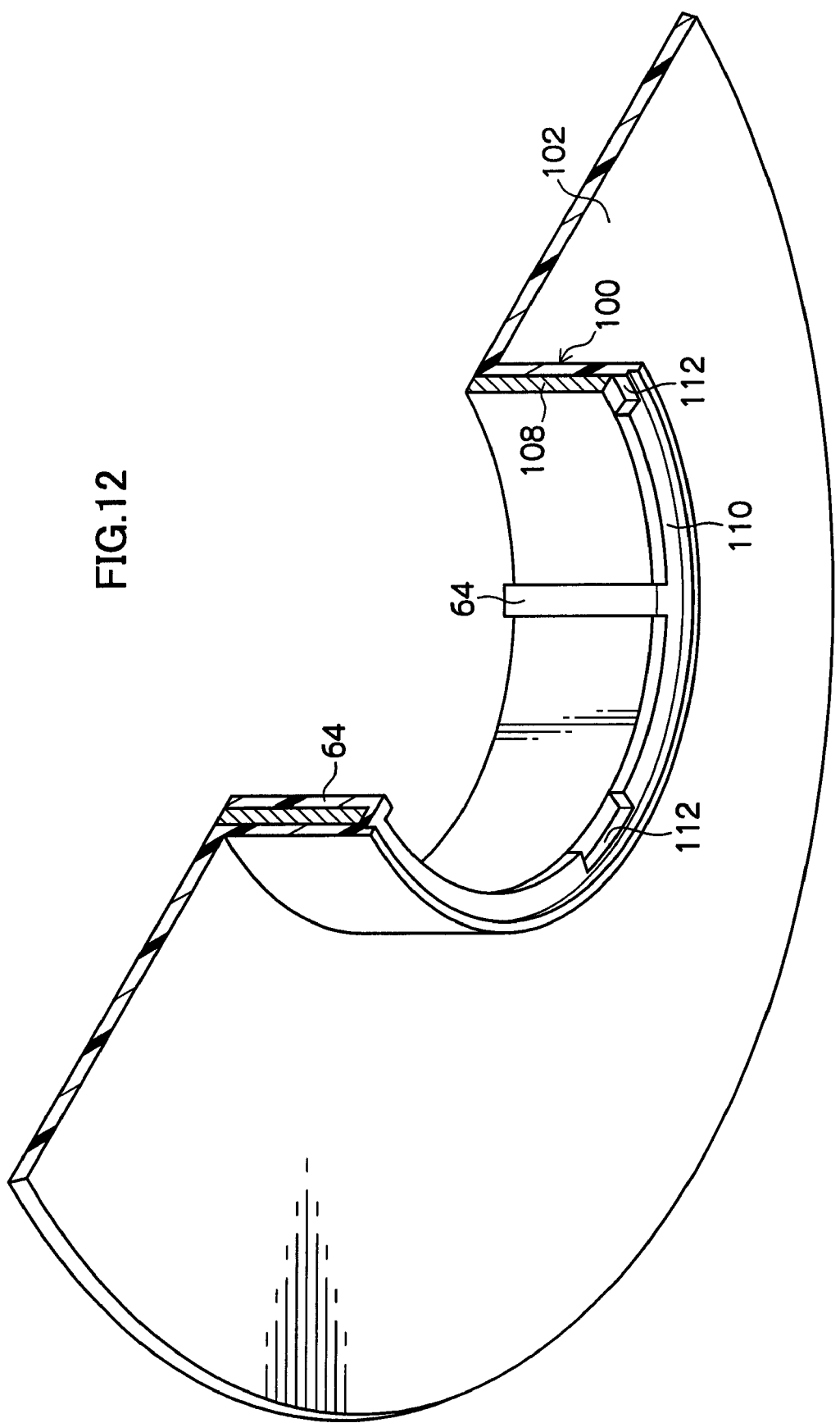
FIG. 12 is a schematic perspective view, seen from below, of the upper flange and the hub with which the first modification of the reel pertaining to the embodiment of the invention is disposed.

Further, during molding, resin flows into a gap formed between the lower end surface of the metal ring 108 and the bottom surface of a fixed retainer plate 104B of the mold 104, whereby a resin portion 110 is formed as shown in FIG. 11 and FIG. 12. Accordingly, recesses (exposure portions) 112 formed by the contact projecting portions 106 that the mold 104 includes are formed in the lower end portion of the hub 100, but by forming projecting portions that fit into the recesses 112 on the lower flange and fitting the recesses 112 together with the projecting portions, the lower flange is attached to the hub 100 so as to not rotate in the circumferential direction.

Moreover, in the present embodiment, as shown in FIG. 3, the annular welding rib 86 is disposed on, so as to project from, the lower flange 46 outside of the positioning rib 84, the lower flange 46 is welded to the hub 40, the annular welding rib 89 is disposed on, so as to project from, the upper flange 48, and the upper flange 48 is welded to the hub 40, whereby the upper flange 48, the lower flange 46, and the hub 40 are coaxially integrated, but the upper flange 48 and the lower flange 46 may also be directly welded so that the hub 40 is held between the upper flange 48 and the lower flange 46.

Specifically, as shown in FIG. 14, a substantially annular lower rib (first circular arc rib) 114 insertable into the hub 40 is disposed upright on the upper surface of the lower flange 46 concentrically with the lower flange 46. Cutout portions 116 are disposed in the lower rib 114 so as to not interfere with the gate ribs 64 formed on the hub 40, so that the gate ribs 64 can be disposed inside the cutout portions 116.

Further, positioning projecting portions 118 with which the anti-rotation grooves 82 formed in the hub 40 can fit are disposed on the base portion of the outer peripheral surface side of the lower rib 114 between adjacent cutout portions 116. Moreover, a welding rib 124 whose cross section has a triangular shape is disposed in, so as to project from, the center portion of the end surface of the lower rib 114 along the circumferential direction of the lower rib 114.

Plural upper ribs (first circular arc ribs) 120 are formed on the undersurface of the upper flange 48 at positions corresponding to the lower rib 114 so as to not interfere with the gate ribs 64. Additionally, a space is formed between each two adjacent ribs 120 such that the gate ribs 64 can be inserted therein. Further, positioning projecting portions 122 with which the cutout portions 88 formed in the hub 40 can fit are disposed on the base portion of the outer peripheral surface side of the center portion of the upper ribs 120.

By fitting the anti-rotation grooves 82 in the hub 40 together with the positioning projecting portions 118 of the lower rib 114 of the lower flange 46 and inserting the lower rib 114 into the hub 40, the lower flange 46 is attached to the hub 40 so as to not rotate with respect to the hub 40. Additionally, by fitting the positioning projecting portions 122 of the upper flange 48 together with the cutout portions 88 in the hub 40 and inserting the upper ribs 120 into the hub 40, the upper flange 48 is also attached to the hub 40 so as to not rotate with respect to the hub 40.

Figure 15:
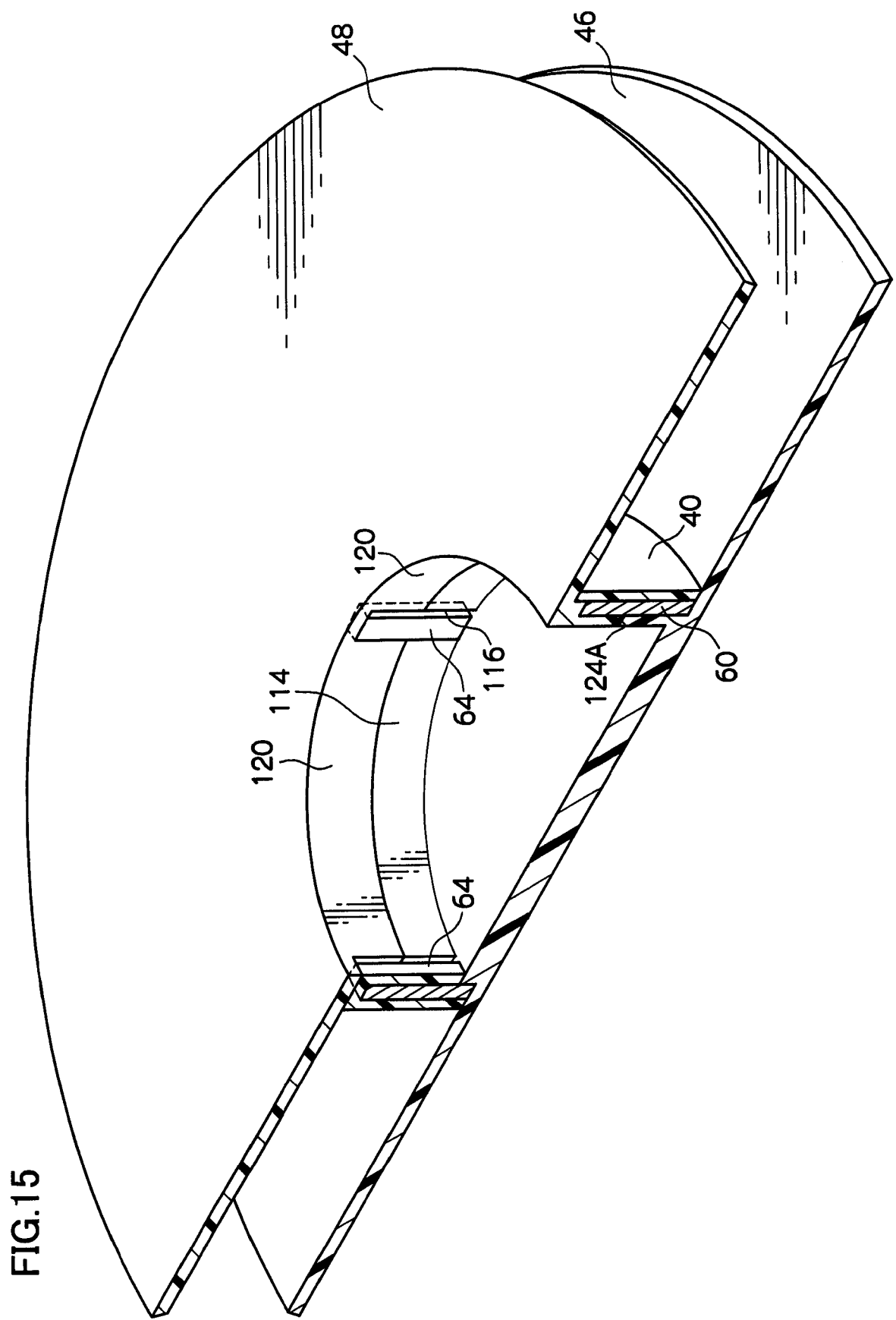
FIG. 15 is a schematic perspective view showing the second modification of the reel pertaining to the embodiment of the invention.

After the lower flange 46 and the upper flange 48 have been attached to the hub 40 in this manner, the welding rib 124 of the lower rib 114 is melted by ultrasonic welding or the like so that, as shown in FIG. 15, the plural upper ribs 120 are welded to the corresponding lower rib 114 (welding portions 124A), whereby the hub 40 is held between the upper flange 48 and the lower flange 46.

By welding the plural upper ribs 120 to the corresponding lower rib 114 and not directly welding the upper flange 48 and the lower flange 46 to the hub 40, it can be ensured that the constricting force of the magnetic tape T applied to the hub 40 is not transmitted to the upper flange 48 and the lower flange 46, and deformation of the upper flange 48 and the lower flange 46 can be prevented.

As described above, according to the present invention, a reel and a recording tape cartridge where positional shifting of the reinforcement ring is prevented are provided. That is, the resin ring is integrally molded on the outer peripheral surface of the reinforcement ring to form the hub, but one end portion of the reinforcement ring is covered by the consecutive portion made of resin that is continuous with the resin ring, and exposure portions where the one end portion of the reinforcement ring is exposed are formed in the consecutive portion.

That is, projecting portions for forming the exposure portions are formed in a mold in locations corresponding to the exposure portions, and when the mold is clamped, the projecting portions for forming the exposure portions come into contact with the one end portion of the reinforcement ring. Because the consecutive portion is not formed on the other end surface of the reinforcement ring, the other end surface of the reinforcement ring is exposed. That is, when the mold is clamped, the mold also comes into contact with the other end surface of the reinforcement ring.

Thus, during molding, movement of the reinforcement ring is strictly limited. Consequently, even if the reinforcement ring receives pressure applied by the resin during injection molding, movement of the reinforcement ring is strictly limited, and therefore, positional shifting of the reinforcement ring can be prevented, and deformation of the reinforcement ring can also be prevented.

A second aspect of the invention comprises the reel of the first aspect, wherein first ribs continuous with the consecutive portion are formed in the inner peripheral surface of the reinforcement ring.

In the second aspect, the first ribs continuous with the consecutive portion are formed in the inner peripheral surface of the reinforcement ring. By forming the first ribs, reinforcement of the hub can be performed. Gates that are injection openings for injecting a resin material during molding may also be disposed in the first ribs.

In this case, after the reinforcement ring has been inserted inside the mold that molds the hub, the inside of a space formed by the mold is filled with the resin via the gates. That is, the resin flows from spaces for forming the first ribs, through a space for forming the consecutive portion, and then into a space for forming the reinforcement ring, so that the reinforcement ring and the hub become integrated.

A third aspect of the invention comprises the reel of the second aspect, wherein the first ribs are disposed in at least three locations at equidistant intervals along the circumferential direction of the reinforcement ring, and the exposure portions are formed in portions of the consecutive portion that are in substantially center portions between adjacent first ribs.

In the third aspect, by disposing the first ribs at equidistant intervals along the circumferential direction of the reinforcement ring, when gates are disposed in the first ribs, the resin injected from the gates flows evenly inside the space in the mold, so that the hub precision (roundness) can be improved.

Further, because the resins flowing in from adjacent gates meet each other in the substantially center portions of adjacent first ribs, welds (formed by melted resin joining together) occur. For this reason, locations where welds occur are cut out as the exposure portions in the end surface of the hub, so that variations in the dimension of the hub in its height direction can be reduced.

A fourth aspect of the invention comprises the reel of any of the first to third aspects, wherein projections are formed on the flanges, and anti-rotation grooves that fit together with the projections formed on the flanges to regulate movement of the hub in the circumferential direction are formed in the reinforcement ring.

When the reel is configured by three parts—two flanges and the hub—it becomes necessary to position the hub with respect to the circumferential direction of the flanges. For this reason, in the invention of the fourth aspect, the anti-rotation grooves that fit together with the projections formed on the flanges are disposed in the reinforcement ring.

In order to disposed the anti-rotation grooves, anti-rotation projecting portions of substantially the same shape as the anti-rotation grooves are formed at locations corresponding to the anti-rotation grooves in the mold that molds the hub. Then, when the mold is clamped, the anti-rotation projecting portions come into contact with locations corresponding to the anti-rotation grooves in the reinforcement ring. That is, during insert molding, rotation of the reinforcement ring is prevented by the anti-rotation projecting portions.

A fifth aspect of the invention comprises the reel of the second aspect, wherein the exposure portions and the anti-rotation grooves are formed such that their positions along the circumferential direction of the reinforcement ring are the same.

In the fifth aspect, because the exposure portions and the anti-rotation grooves are formed such that their positions along the circumferential direction of the reinforcement ring are the same, the positions of the exposure portion-forming projecting portions and the anti-rotation projecting portions along the circumferential direction become the same in the mold, or in other words, the exposure portion-forming projecting portions and the anti-rotation projecting portions are positioned so as to hold the reinforcement ring therebetween from above and below. Consequently, positional shifting of the reinforcement ring virtually does not occur because movement of the reinforcement ring can be limited above and below the reinforcement ring by the exposure portion-forming projecting portions and the anti-rotation projecting portions.

A sixth aspect of the invention comprises the reel of the fourth or fifth aspect, wherein the anti-rotation grooves are disposed in the inner peripheral surface of the reinforcement ring.

In the above reel, because the first ribs are disposed in the inner peripheral surface of the reinforcement ring, the anti-rotation grooves are disposed in the inner peripheral surface of the reinforcement ring—that is, the exposure portion-forming projecting portions are disposed on the gates side. Positional shifting of the reinforcement ring is prevented by disposing the exposure portion-forming projecting portions on the gates side because pressure applied by the resin during injection molding is highest in the vicinity of the gates.

A seventh aspect of the invention is a reel comprising: a hub around which recording tape is wound; and flanges that are disposed on both end portions of the hub and hold width direction end portions of the recording tape, wherein the flanges include projections, the hub includes a reinforcement ring in which anti-rotation grooves that fit together with the projections formed on the flanges to regulate movement of the hub in the circumferential direction are formed in one end portion, a resin ring integrally molded on the outer peripheral surface of the reinforcement ring, a consecutive portion made of resin that covers the other end portion of the reinforcement ring and is continuous with the resin ring, and second ribs that are formed continuously with the consecutive portion in the inner peripheral surface of the reinforcement ring and whose width becomes wider near the consecutive portion, and exposure portions where the other end portion of the reinforcement ring is exposed are formed in the consecutive portion.

In the case of a hub structure where the reinforcement ring is integrated with resin by insert molding, when the fluid pressure of the resin is too high, there is a possibility of deformation of the reinforcement ring and positional shifting thereof from its original position, and in a worst case, the reinforcement ring can be exposed from the resin layer. On the other hand, when gates are disposed in the second ribs, the fluidity of the resin worsens by a too much narrow second ribs, which causes misshaping such as warpage and shrinkage. Further, at the gates, the resin pressure becomes a maximum but the resin pressure becomes applied in one direction from the inside of the hub to the outside thereof.

For this reason, in the seventh aspect, the gates disposed in the second ribs is positioned away from the consecutive portion, and the width of the second ribs are made wider close to the consecutive portion, so that the rib width of the second ribs at the gate portions is made to be the smallest to lower the resin pressure beforehand. Additionally, by increasing the rib width away from the gates, the flow velocity is lowered to raise the pressure. Thus, in addition to the effects that the reel pertaining to the first aspect, the effect of preventing worsening of the resin fluidity is obtained.

An eighth aspect of the invention comprises the reel of the seventh aspect, wherein the second ribs are formed such that their width gradually becomes wider toward the consecutive portion.

In the eighth aspect, because the width of the second ribs is gradually made wider from the gates side toward the consecutive portion, the resin fluidity can be further improved.

A ninth aspect of the invention comprises the reel of the seventh or eighth aspect, wherein the second ribs are disposed in at least three locations at equidistant intervals along the circumferential direction of the reinforcement ring, and the exposure portions are formed in portions of the consecutive portion that are in substantially center portions between adjacent second ribs.

In the ninth aspect, effects that are substantially the same as the effects of the reel of the third aspect can be achieved.

A tenth aspect of the invention comprises the reel of the ninth aspect, wherein the exposure portions and the anti-rotation grooves are disposed in the same positions along the circumferential direction of the reinforcement ring.

In the tenth aspect, effects that are substantially the same as the effects achieved by the reel of the fifth aspect can be achieved.

An eleventh aspect of the invention comprises the reel of any one of the seventh to tenth aspects, wherein the anti-rotation grooves are disposed in the inner peripheral surface of the reinforcement ring.

In the eleventh aspect, effects that are substantially the same as the effects achieved by the reel of the sixth aspect can be achieved.

A twelfth aspect of the invention comprises the reel of any one of the first to eleventh aspects, further comprising a first circular arc rib that is formed concentrically on one of the flanges and is insertable into the hub and a second circular arc rib that is formed on the other of the flanges in correspondence to the first circular arc rib and is welded to the end surface of the first circular arc rib such that the hub is held between the one flange and the other flange.

In the twelfth aspect, the first circular arc rib that can be inserted into the hub is formed concentrically on the one flange, and the second circular arc rib is formed on the other flange in correspondence to the first circular arc rib. The second circular arc rib is welded to the end surface of the first circular arc rib such that the hub is held between the one flange and the other flange.

That is, by directly welding together the one flange and the other flange via first circular arc rib and the second circular arc rib, the hub is held between the one flange and the other flange, and the one flange, the other flange, and the hub are integrated.

In this manner, by not directly welding the hub to the one flange and the other flange, it can be ensured that the constricting force of the recording tape acting on the hub is not transmitted to the one flange and the other flange. Thus, deformation of the one flange and the other flange can be prevented.

A thirteenth aspect of the invention is a recording tape cartridge disposed with the reel of any one of the first to twelfth aspects and a case that rotatably houses the reel.

What is claimed is:

1. A reel comprising:
a hub around which recording tape is wound; and
flanges that are disposed on both end portions of the hub and hold width direction end portions of the recording tape,
wherein
the hub includes
a cylindrical reinforcement ring,
a resin ring integrally molded on the outer peripheral surface of the reinforcement ring, and
a consecutive portion made of resin that covers one end portion of the reinforcement ring and is continuous with the resin ring,
and exposure portions where the one end portion of the reinforcement ring is exposed are formed in the consecutive portion.

2. The reel of claim 1, wherein first ribs continuous with the consecutive portion are formed in the inner peripheral surface of the reinforcement ring.

3. The reel of claim 2, wherein the first ribs are disposed in at least three locations at equidistant intervals along the circumferential direction of the reinforcement ring, and the exposure portions are formed in portions of the consecutive portion that are in substantially center portions between adjacent first ribs.

4. The reel of claim 3, wherein projections are formed on the flanges, and anti-rotation grooves that fit together with the projections formed on the flanges to regulate movement of the hub in the circumferential direction are formed in the reinforcement ring.

5. The reel of claim 4, wherein the exposure portions and the anti-rotation grooves are formed such that their positions along the circumferential direction of the reinforcement ring are the same.

6. The reel of claim 5, wherein the anti-rotation grooves are disposed in the inner peripheral surface of the reinforcement ring.

7. The reel of claim 4, wherein the anti-rotation grooves are disposed in the inner peripheral surface of the reinforcement ring.

8. The reel of claim 2, wherein projections are formed on the flanges, and anti-rotation grooves that fit together with the projections formed on the flanges to regulate movement of the hub in the circumferential direction are formed in the reinforcement ring.

9. The reel of claim 8, wherein the exposure portions and the anti-rotation grooves are formed such that their positions along the circumferential direction of the reinforcement ring are the same.

10. The reel of claim 9, wherein the anti-rotation grooves are disposed in the inner peripheral surface of the reinforcement ring.

11. The reel of claim 8, wherein the anti-rotation grooves are disposed in the inner peripheral surface of the reinforcement ring.

12. The reel of claim 1, wherein projections are formed on each of the flanges, and anti-rotation grooves that fit together with the projections formed on the flanges to regulate movement of the hub in the circumferential direction are formed in the reinforcement ring.

13. The reel of claim 12, wherein the exposure portions and the anti-rotation grooves are formed such that their positions along the circumferential direction of the reinforcement ring are the same.

14. The reel of claim 13, wherein the anti-rotation grooves are disposed in the inner peripheral surface of the reinforcement ring.

15. The reel of claim 12, wherein the anti-rotation grooves are disposed in the inner peripheral surface of the reinforcement ring.

16. The reel of claim 1, further comprising
a first circular arc rib that is formed concentrically on one of the flanges and is insertable into the hub, and
a second circular arc rib that is formed on the other of the flanges in correspondence to the first circular arc rib and is joined together with the end surface of the first circular arc rib such that the hub is held between the one flange and the other flange.

17. A reel comprising:
a hub around which recording tape is wound; and
flanges that are disposed on both end portions of the hub and hold width direction end portions of the recording tape,
wherein
each of the flanges includes projections,
the hub includes
a reinforcement ring in which anti-rotation grooves that fit together with the projections formed on the flanges to regulate movement of the hub in the circumferential direction are formed in one end portion,
a resin ring integrally molded on the outer peripheral surface of the reinforcement ring,
a consecutive portion made of resin that covers the other end portion of the reinforcement ring and is continuous with the resin ring, and second ribs that are formed continuously with the consecutive portion in the inner peripheral surface of the reinforcement ring and whose width becomes wider near the consecutive portion, and exposure portions where the other end portion of the reinforcement ring is exposed are formed in the consecutive portion.

18. The reel of claim 17, wherein the second ribs are formed such that their width gradually becomes wider toward the consecutive portion.

19. The reel of claim 18, wherein the second ribs are disposed in at least three locations at equidistant intervals along the circumferential direction of the reinforcement ring, and the exposure portions are formed in portions of the consecutive portion that are in substantially center portions between adjacent second ribs.

20. The reel of claim 19, wherein the exposure portions and the anti-rotation grooves are disposed in the same positions along the circumferential direction of the reinforcement ring.

21. The reel of claim 20, wherein the anti-rotation grooves are disposed in the inner peripheral surface of the reinforcement ring.

22. The reel of claim 19, wherein the anti-rotation grooves are disposed in the inner peripheral surface of the reinforcement ring.

23. The reel of claim 18, wherein the anti-rotation grooves are disposed in the inner peripheral surface of the reinforcement ring.

24. The reel of claim 17, wherein the second ribs are disposed in at least three locations at equidistant intervals along the circumferential direction of the reinforcement ring, and the exposure portions are formed in portions of the consecutive portion that are in substantially center portions between adjacent second ribs.

25. The reel of claim 24, wherein the exposure portions and the anti-rotation grooves are disposed in the same positions along the circumferential direction of the reinforcement ring.

26. The reel of claim 25, wherein the anti-rotation grooves are disposed in the inner peripheral surface of the reinforcement ring.

27. The reel of claim 24, wherein the anti-rotation grooves are disposed in the inner peripheral surface of the reinforcement ring.

28. The reel of claim 17, wherein the anti-rotation grooves are disposed in the inner peripheral surface of the reinforcement ring.

29. The reel of claim 17, further comprising
a first circular arc rib that is formed concentrically on one of the flanges and is insertable into the hub, and
a second circular arc rib that is formed on the other of the flanges in correspondence to the first circular arc rib and is joined together with the end surface of the first circular arc rib such that the hub is held between the one flange and the other flange.

30. A recording tape cartridge disposed with the reel of any one of claims 1 to 29 and a case that rotatably houses the reel.

* * * * *